(12) United States Patent
Tagawa et al.

(10) Patent No.: US 6,456,494 B1
(45) Date of Patent: Sep. 24, 2002

(54) ENTERTAINMENT SYSTEM AND EXTERNAL STORAGE DEVICE THEREFOR

(75) Inventors: Kazusato Tagawa; Hiroki Ogata, both of Tokyo (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/655,456

(22) Filed: Sep. 5, 2000

(30) Foreign Application Priority Data

Sep. 6, 1999 (JP) .......................................... 11-251818

(51) Int. Cl.$^7$ ................................................ H05K 5/02
(52) U.S. Cl. ......................... 361/724; 361/725; 463/38; 345/685
(58) Field of Search ................................. 361/724–727; 463/36, 38, 44; 345/685; D21/328, 329

(56) References Cited

U.S. PATENT DOCUMENTS 5,558,577 A * 9/1996 Kato ........................... 463/36
5,644,113 A * 7/1997 Date et al. .................. 200/5 R

FOREIGN PATENT DOCUMENTS

| EP | 684057 | 11/1995 |
|----|--------|---------|
| JP | 59-47984 U | 3/1984 |
| JP | 5-4058 Y2 | 12/1986 |
| JP | 5-4058 | 2/1993 |
| JP | 7-313730 A | 12/1995 |
| JP | 8077320 | 3/1996 |

* cited by examiner

*Primary Examiner*—Darren Schuberg
*Assistant Examiner*—Hung Van Duong
(74) *Attorney, Agent, or Firm*—Lerner, David, Littenberg, Krumholz & Mentlik, LLP

(57) ABSTRACT

An external storage device connected to an entertainment system for storing game information is provided. Even if there are plural types of entertainment systems, and the correspondence between the types of entertainment systems and the kind of the external storage device cannot be grasped, the external storage device can be readily connected to the entertainment system without any trouble. The external storage device 230 connected to the entertainment system to receive information from the entertainment system and store the information therein has a portion to-be-mounted to engage with a receiving portion 603 of the entertainment system for electrical connection with the entertainment system. The portion to-be-mounted 603 has a shape preventing itself from engaging with the receiving portion of a predetermined particular type of entertainment system out of the entertainment systems in systematized series, for preventing a connection with the predetermined particular type of the entertainment system.

9 Claims, 15 Drawing Sheets

ENTERTAINMENT SYSTEM AND EXTERNAL STORAGE DEVICE THEREFOR

This application claims a priority based on Japanese Patent Application No. 11-251818 filed on Sep. 6, 1999, the entire contents of which are incorporated herein by reference for all purposes.

BACKGROUND OF THE INVENTION

The present invention relates to an information processing unit on which an external storage device can be mounted, and more particularly, to an entertainment system whose main body has a receiving portion into/from which a card type external storage device can be inserted/extracted.

There is known a conventional information processing unit which records/reproduces necessary information in/from a small sized, external storage device such as a card type memory which is directly inserted into an insertion slot provided at the main body of the information processing unit for electrical connection. A game system disclosed by Japanese Patent Laid-Open No.7-313730 has a configuration where a card type external storage device is prepared for each game player, the device is placed into the insertion slot of the main body of the game system, and information such as a game manipulation process of each of the game players is stored. Thus, the game information peculiar to each of the game players can be recorded in the card type external storage device, thereby the device being carried to another game system, and it is possible to immediately reproduce the game manipulation process of the previous game so as to resume the game, even in the different game system.

SUMMARY OF THE INVENTION

The entertainment system employing the card type external storage device as described above is convenient in that a user can carry a card type external storage device where his/her own game information is stored and resume a previous game even in another entertainment system. However, in the case where there are a plurality of types of entertainment systems and recording formats or the like are different among the system types, it should be determined whether or not the type of the external storage device can be adapted to the entertainment system so as to avoid a trouble. However, it would be difficult for the user to recognize all types of entertainment systems and understand which type of the entertainment system corresponds to which kind of card type external storage device. Also, viewed in the light of maintaining the convenience of the card type external storage device storing game information, it is desirable to establish a card type external storage device which can be utilized without any trouble by a user who has no knowledge of correspondence between the types of entertainment systems and the kinds of the card type external storage devices.

It is an object of the present invention to provide an external storage device to be connected to an entertainment system for storing game information, which can be readily connected to the entertainment system without any trouble, even if there are a plurality of types of entertainment systems and it is impossible to grasp the correspondence between the types of entertainment systems and the kinds of the external storage devices.

In order to achieve the above-described object, an external storage device for an entertainment system according to the present invention is provided, having the following features.

That is, there is provided an external storage device being connected to an entertainment system for receiving information from the entertainment system and for storing said information therein, having a connection portion to be connected to the entertainment system, wherein the connection portion has a shape to prevent the external storage device from being connected to a predetermined particular type of entertainment system.

DESCRIPTION OF THE PREFERRED EMBODIMENTS

An entertainment system and an external storage device there for according to one embodiment of the present invention will be now described.

Figure 1:
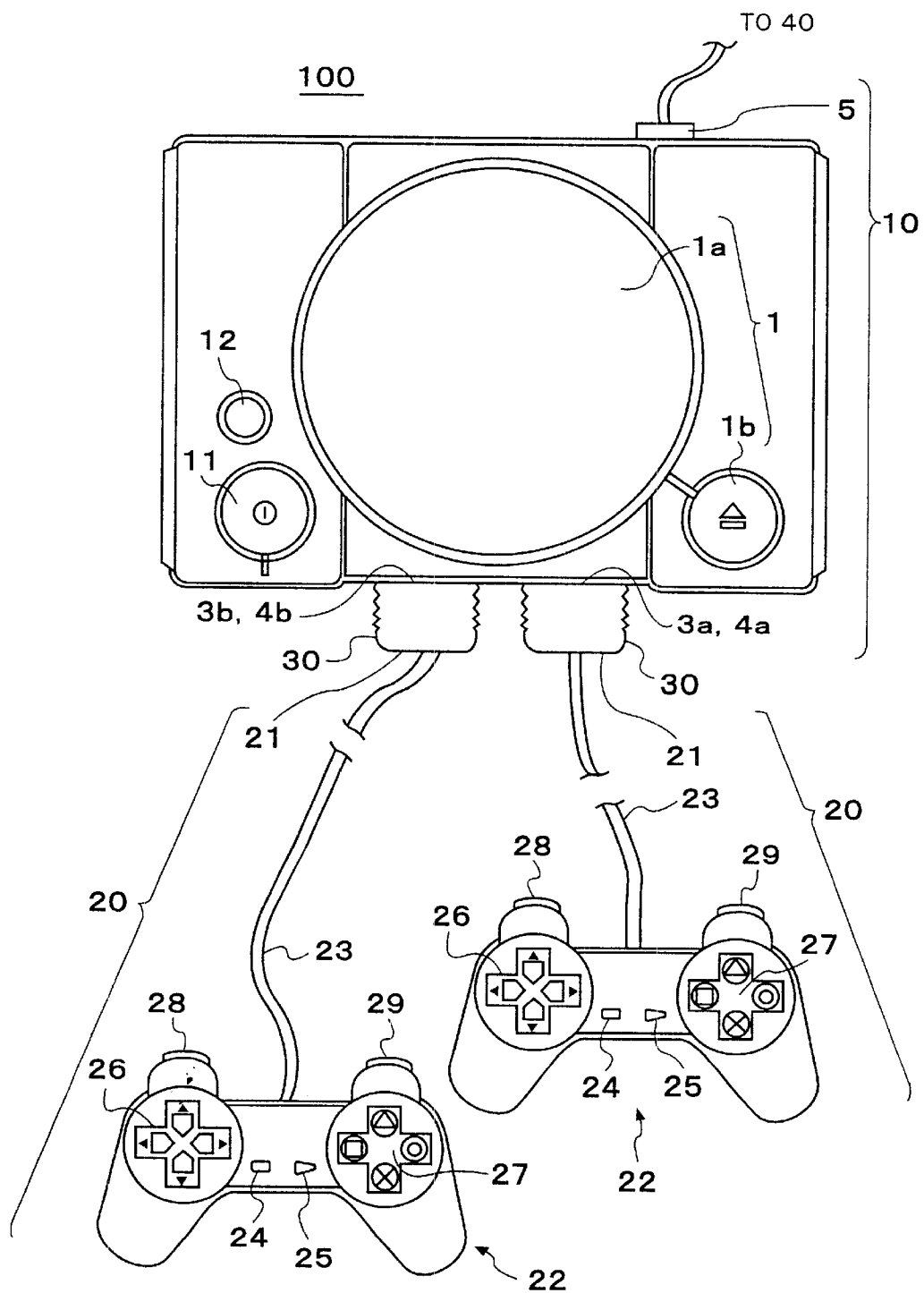
FIG. 1 is a top plan view of the general overview of a first type entertainment system 100 according to an embodiment of the present invention.
Figure 2:
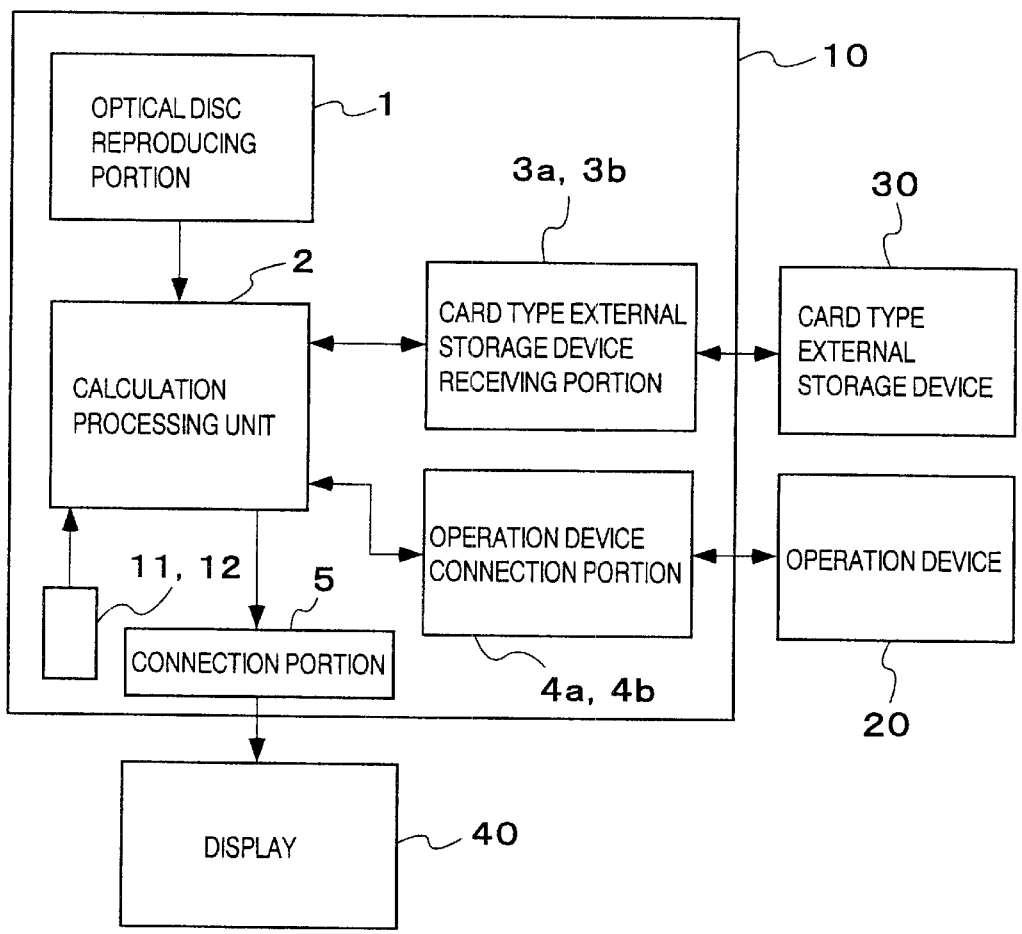
FIG. 2 is a block diagram of the configuration of the entertainment system 100 shown in FIG. 1.
Figure 5:
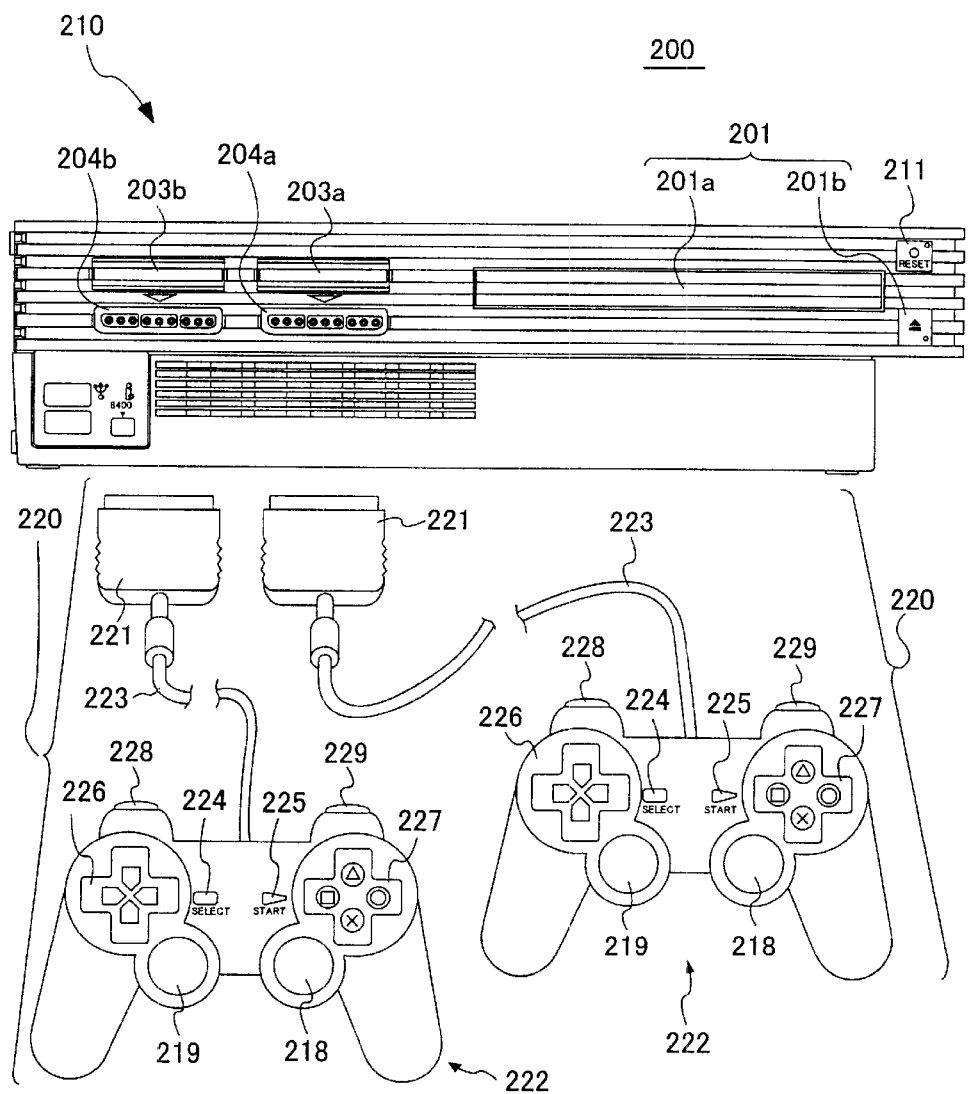
FIG. 5 is a view showing the overview of the front side surface of the main body of a second type entertainment system 200 and the overview of the upper surface of the operation device according to an embodiment of the present invention.
Figure 6:
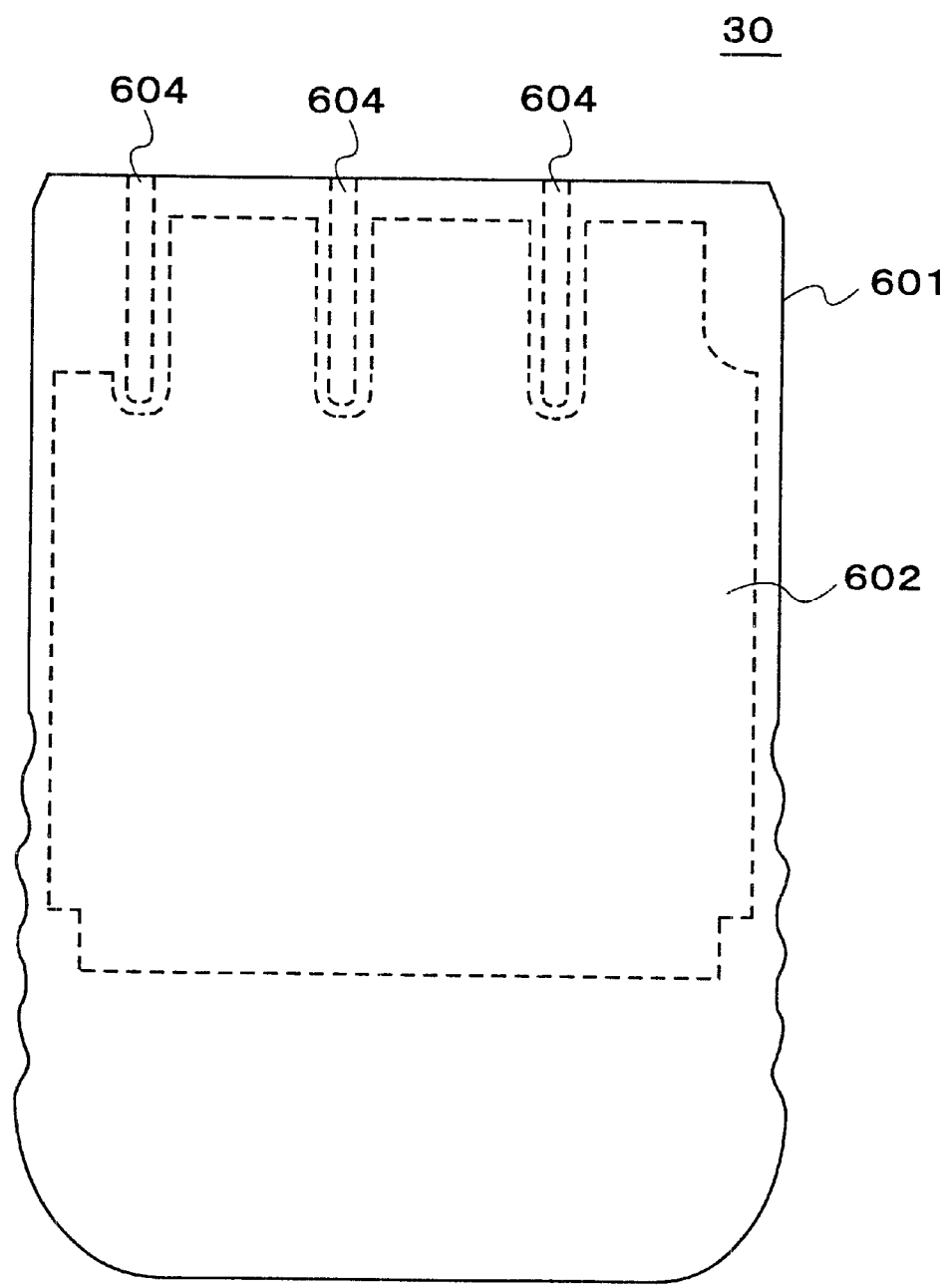
FIG. 6 is a top plan view of a card type external storage device 30 of a first kind according to an embodiment of the present invention.
Figure 10:
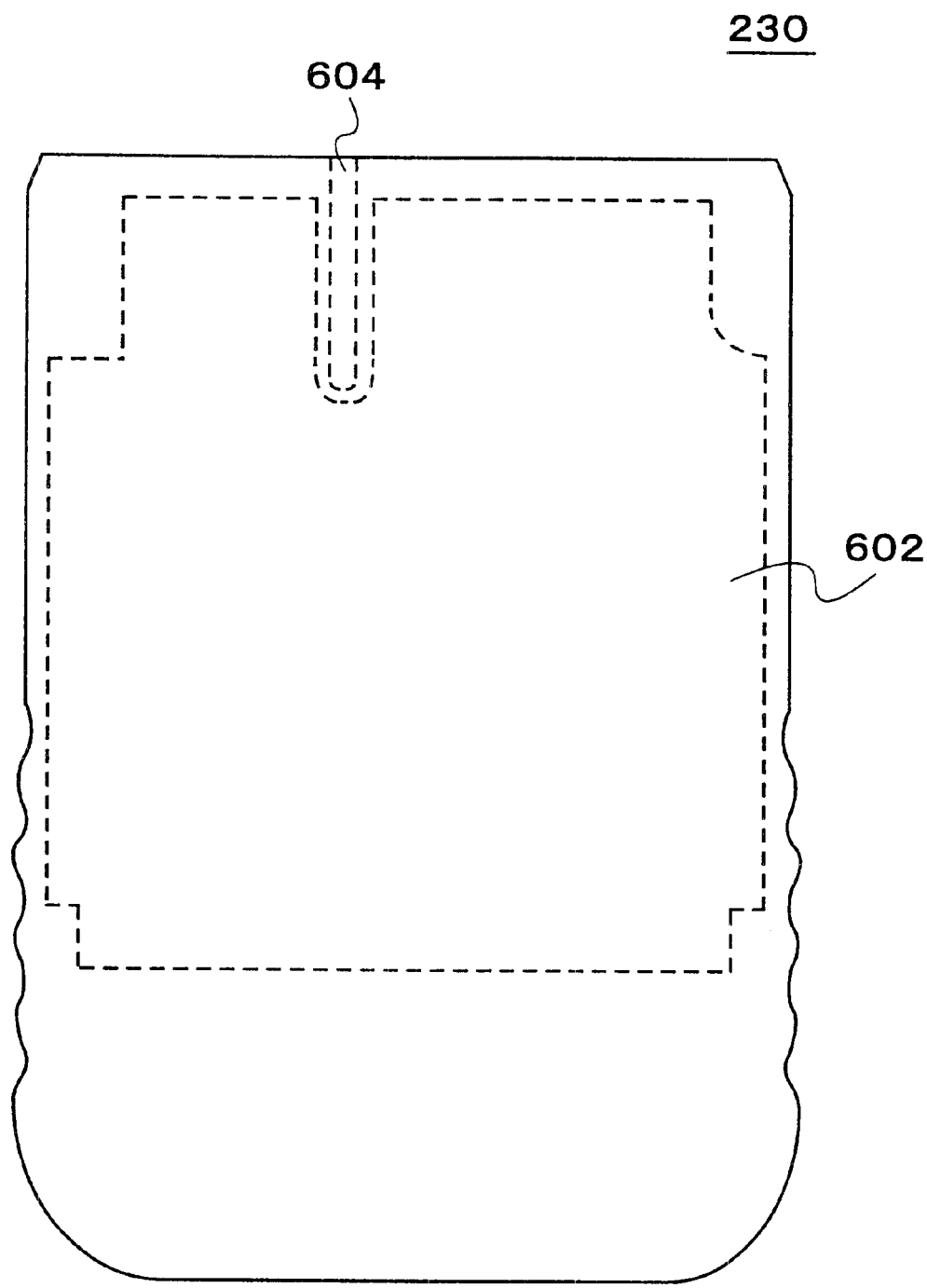
FIG. 10 is a top plan view of a card type external storage device 230 of a second kind according to an embodiment of the present invention.

According to the embodiment, there are two types of entertainment systems, the first type system and the second type system. The first and second type systems are in systematized series. As shown in FIGS. 1 and 2, an entertainment system 100 of the first type comprises a main body 10, and an operation device 20, which is attachably and detachably connected to the main body 10. At most two operation devices 20 can be connected to the main body 10. A card type external storage device 30 of a first kind as shown in FIG. 6 can be mounted on the first type entertainment system 100 for each of the operation devices 20. Meanwhile, as shown in FIG. 5, an entertainment system 200 of the second type comprises a main body 210 and an operation device 220. At most two operation devices 220 can be connected to the main body 210. As shown in FIG. 10, a card type external storage device 230 of a second kind can be mounted on the second type entertainment system 200 for each of the operation devices 220.

The entertainment system 100 can communicate with the external storage device 30 of the first kind mounted on the system to transmit game information to the device for storage, while the system 100 can readout game information stored in the external storage device 30. The entertainment system 200 can communicate with the external storage device 230 of the second kind mounted on the system to store/read game information in/from the device. In this case, the external storage device 30 of the first kind and the external storage device 230 of the second kind have different storage capacities and subjected to different communication control methods. Therefore, the entertainment system 100 can only communicate with the external storage device 30 of the first kind. Meanwhile, the entertainment system 200 can communicate not only with the external storage device 230 of the second kind but also with the external storage device 30 of the first kind. As a result, the external storage device 30 of the first kind can be used both for the entertainment systems 100 and 200, while the external storage device 230 of the second kind can only be used for the entertainment system 200, in other words, one-way interchangeability is established. Therefore, in this embodiment, it is realized that the external storage device 30 of the first kind has a structure to be able to be mounted on both the entertainment systems 100 and 200, while the external storage device 230 of the second kind has a structure to be able to be mounted only on the entertainment system 200. Thus, the user does not have to understand the correspondence between the entertainment systems 100 and 200, and the external storage devices 30 and 230 and still can easily enjoy playing games without any trouble, utilizing the external storage devices. This will be now described in detail.

The structure of the first type entertainment system 100 will be described.

As shown in FIG. 2, the main body 10 of the first type entertainment system 100 comprises an optical disc reproducing portion 1, a calculation processing unit 2, card type external storage device receiving portions 3a, 3b, operation device connection portions 4a,4b, switches 11, 12, and a display connection portion 5, etc. The optical disc reproducing portion 1 includes an upper lid 1a, a switch 1b, a rotary shaft, a rotation driving source, a reproducing head, and a reproducing circuit, etc. The upper lid 1a is provided on the upper surface of the main body 10 as shown in FIG. 1, and can be opened in the upward direction. The rotary shaft is provided under the upper lid 1a. An optical disc on which game programs and images to be displayed are previously stored is mounted at the rotary shaft. The rotation driving source rotates the rotary shaft. The switch 1b is used to open the upper lid 1a, and provided on the upper surface of the main body 10. The power supply switch 11 and the reset switch 12 are also provided on the upper surface of the main body 10.

Figure 3:
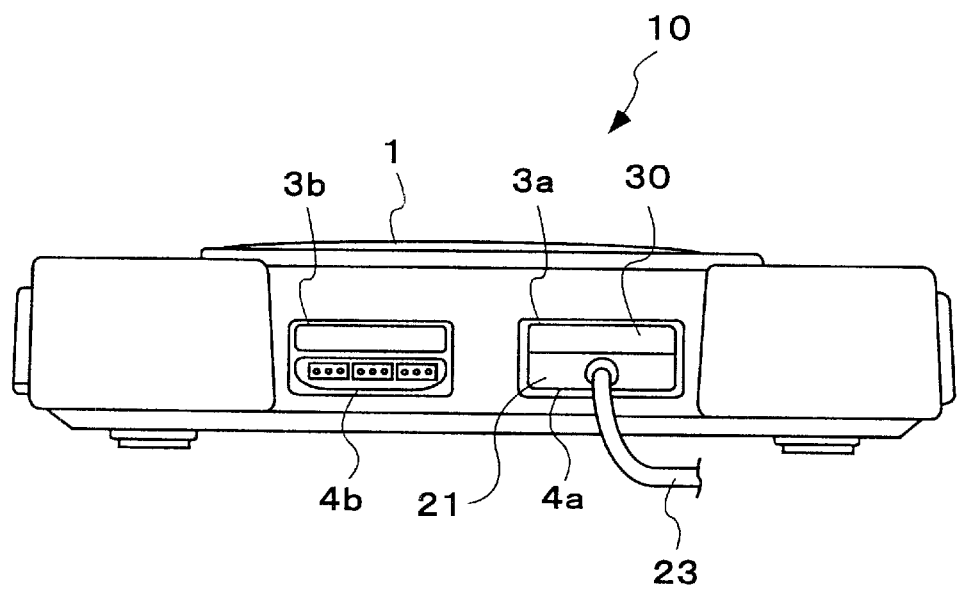
FIG. 3 is a side view showing the forefront side surface of the main body 10 of the entertainment system 100 shown in FIG. 1.
Figure 4:
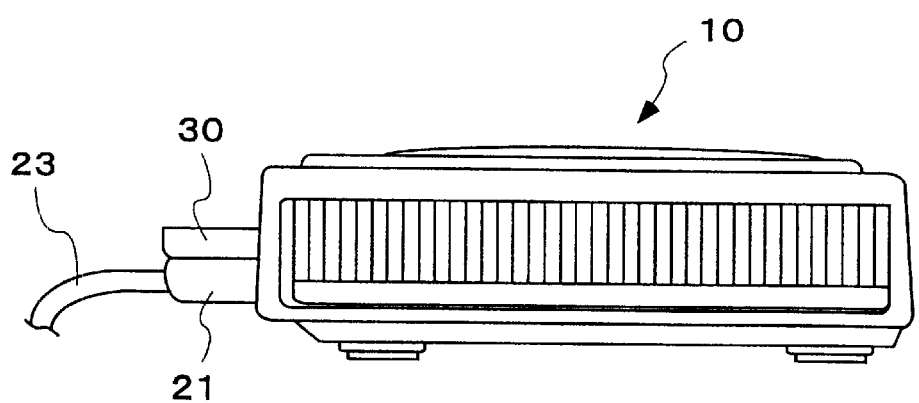
FIG. 4 is a side view showing a side surface of the main body 10 of the entertainment system 100 shown in FIG. 1.

At the front side surface of the main body 10, as shown in FIG. 3, two receiving portions 3a and 3b are arranged side by side. The receiving portions 3a and 3b respectively receive the card type external storage devices 30 of the first kind as shown in FIGS. 1, 3 and 4. The structure of the receiving portions 3a and 3b will be detailed later.

There are connection portions 4a and 4b under the receiving portions 3a and 3b, respectively. At the rear side surface of the main body 10, there are a display connection portion 5 and a power supply connection portion (not shown), etc.

The operation device 20 includes a connector 21, an operation portion 22, and a cable 23. The operation portion 22 is provided with various operation switches 24 to 29. The connector 21 is inserted into the connection portions 4a,4b of the main body 10 for connection as shown in FIGS. 1, 3 and 4. The connector 21 connected to each of the connection portions 4a, 4b is formed to have a portion projecting from the main body 100 in a shape to just overlap the shape of the projecting portion of the card type external storage device 30 mounted on the receiving portion 3a, when viewed from the top.

Next, the structure of the second type entertainment system 200 will be described.

Similarly to the first type entertainment system 100, the main body 210 of the second type entertainment system 200 comprises an optical disc reproducing portion 201, an operation processing device, card type storage device receiving portions 203a, 203b, operation device connection portions 204a 204b, a switch 211, and a display connection portion, etc. (FIG. 5). The optical disc reproducing portion 201 has generally the same structure as the optical disc reproducing portion 1 of the entertainment system 100 of the first type, but the portion to mount an optical disc is a drawer type tray 201a. The tray 201a is provided at the front side surface of the main body 210 as shown in FIG. 5 and drawn out forward. At the front side surface of the main body 210, a switch 201b to draw the tray 201a is also provided.

The receiving portions 203a, 203b and the connection portions 204a, 204b are arranged respectively in a vertical direction at the front side surface of the main body 210 as shown in FIG. 5. The structure of the receiving portions 203a and 203b will be detailed later.

Similarly to the operation device 20 described above, the operation device 220 of the second type entertainment system 200 includes a connector 221, an operation portion 222 and a cable 223. The connector 221 is connected to each of the connection portions 204a and 204b of the main body 210. The operation portion 222 also includes stick type switches 218 and 219 in addition to various switches 224 to 229.

Next, the structure of the receiving portions 3a and 3b of the first type entertainment system 100 and the structure of the card type external storage device 30 of the first kind will be now described.

Figure 14:
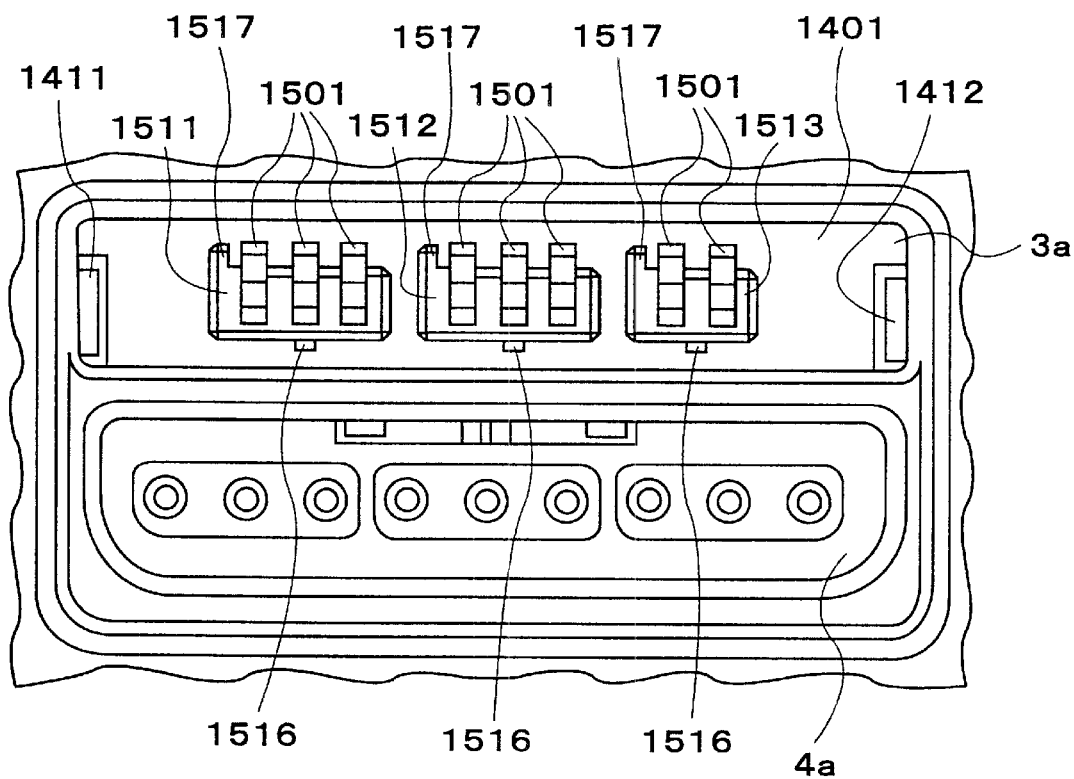
FIG. 14 is a front view of a receiving portion 3a of the first type entertainment system 100 according to an embodiment of the present invention, where a shutter 1402 is removed.
Figure 15:
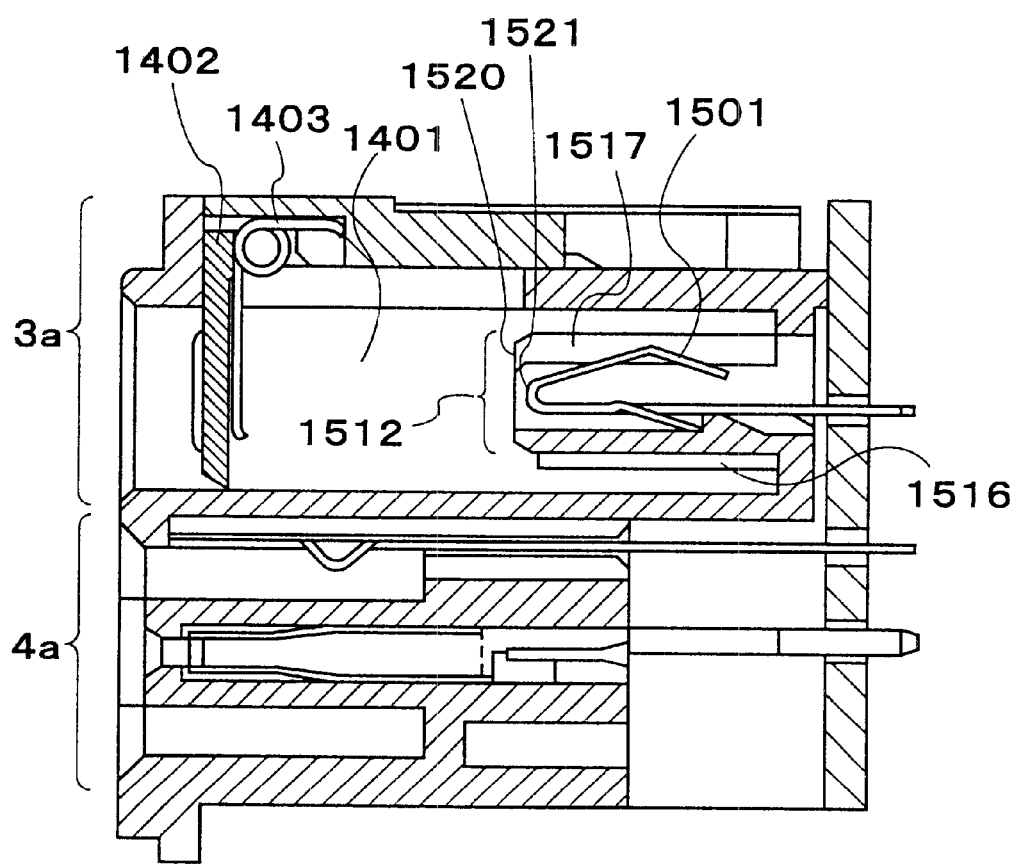
FIG. 15 is a cross sectional view of a receiving portion 3a of the first type entertainment system 100 according to an embodiment of the present invention.

The receiving portion 3a has an opening 1401 to insert the card type external storage device 30 and three terminal holding portions 1511, 1512 and 1513 arranged side by side with a distance therebetween in the opening 1401 as shown in FIG. 14. Each of the terminal holding portions 1511, 1512 and 1513 is provided with two or three terminals 1501. The terminals 1501 are each dog legged at the upper part, project toward the upper side as shown in FIG. 15, and come into contact with the connection terminal 34 of the card type external storage device 30 (FIG. 7) at the part. Among these terminals 1501, the three terminals 1501 of the terminal holding portion 1512 are used to supply a power supply voltage to the card type external storage device 30. Meanwhile, the terminals 1501 of the terminal holding portions 1511 and 1513 are used as signal terminals for game information data.

Figure 7:
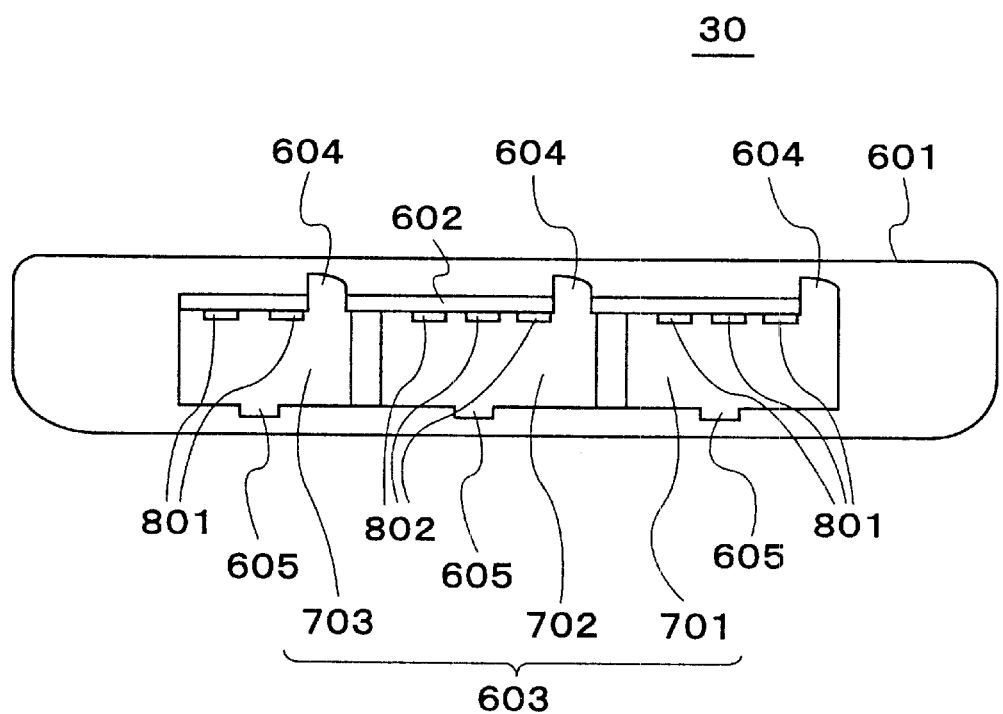
FIG. 7 is a side view of the card type external storage device 30 of the first kind shown in FIG. 6.

The three terminal holding portions 1511, 1512 and 1513 are each provided with a ridge 1517 at the upper portion. The height of the three ridges 1517 is greater than the top of the terminals 1501. Thus, if a user inserts a conductive foreign body such as a coin into the receiving portion 3a by mistake, such a foreign body will not contact the terminal 1501, so that the terminals 1501 are prevented from being short-circuited with one another by the conductive foreign body. When the card type external storage device 30 is inserted, the three ridges 1517 serve to guide the insertion by engaging with the upper groove 604 of the card type external storage device 30 (FIGS. 6 and 7).

Note that the forefront part 1520 of the ridge 1517 may be protruded more forward than the forefront part 1521 of the terminal 1501 as shown in FIG. 15, while it may be positioned flush with the forefront part 1521 of the terminal 1501. In the case where the forefront part 1520 of the ridge 1517 is designed to protrude more forward than the forefront part 1521 of the terminal 1501, an inserted conductive foreign body such as a coin will not contact the forefront part 1521 of the terminal 1501, so that short circuiting can be prevented.

There are ridges 1516 respectively at the lower sections of the three terminal holding portions 1511, 1512 and 1513, and the ridge 1516 engages with the lower groove 305 of the card type external storage device 30 at the time of insertion and guides the insertion.

On both sides of the opening 1401, there are raised portions 1411 and 1412 to engage with recesses provided at the side surface of the card type external storage device 30 and prevent the card type external storage device 30 from coming off.

Figure 16:
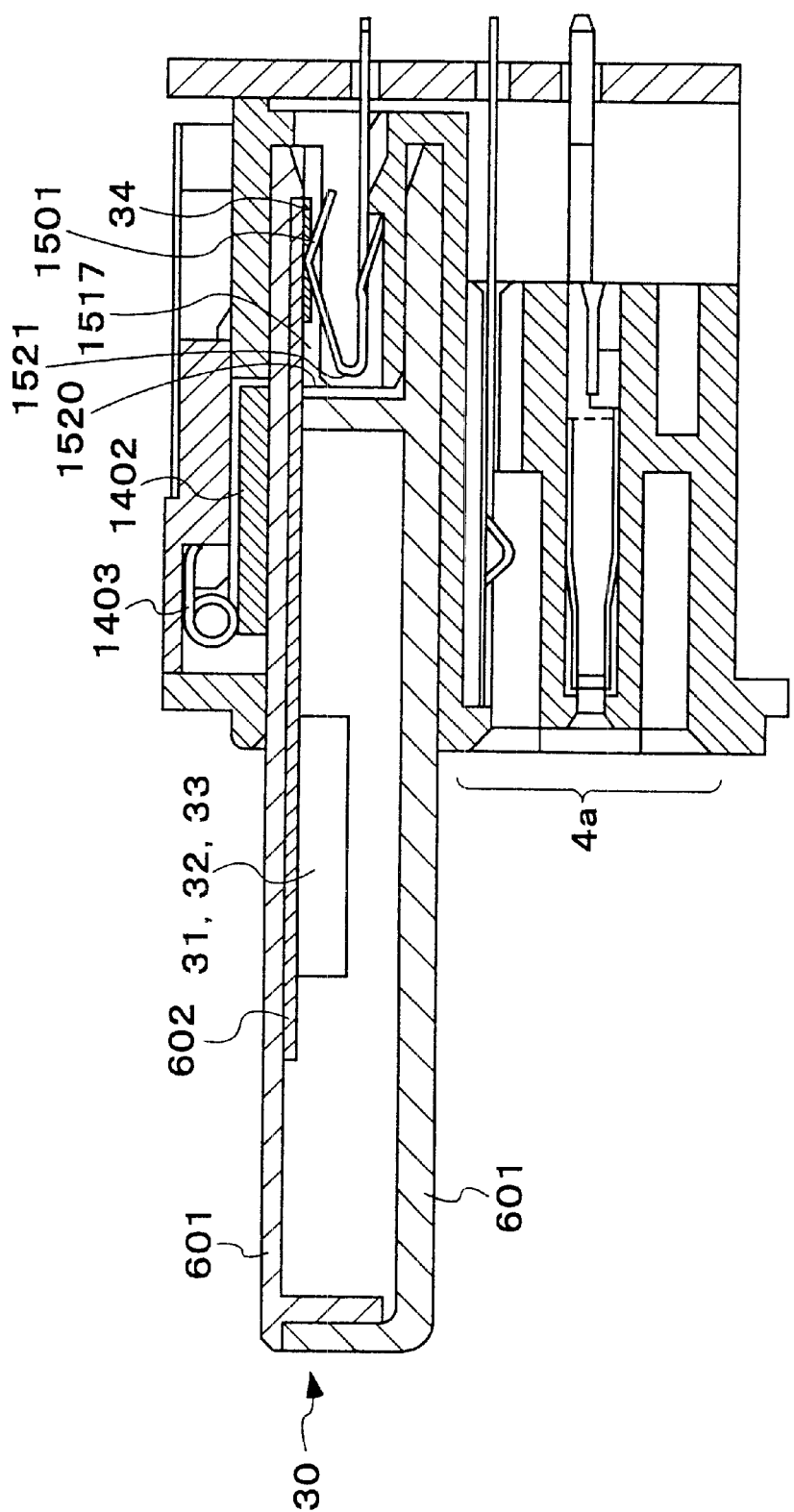
FIG. 16 is a cross sectional view of the state in which the card type external storage device 30 of the first kind is mounted on the receiving portion 3a of the first type entertainment system 100 according to an embodiment of the present invention.

A shutter 1402, which is closed by the force of a spring 1403, is provided at the opening 1401 of the receiving portion 3a. When the card type external storage device 30 is inserted, the shutter 1402 is pushed up by the card type external storage device 30 to be in an opening state as shown in FIG. 16.

Note that the receiving portion 3b has the same structure as that of the receiving portion 3a, and therefore a description is not provided here.

Meanwhile, as shown in FIGS. 6 and 7, the card type external storage device 30 of the first kind has a card type case 601 having a space inside and a circuit board 602 provided therein. An end of the card type case 601 serves as portion to be mounted on the receiving portion 3a of the main body 10. The portion to-be-mounted is provided with an opening 603 having its inner space partitioned into three spaces 701, 702 and 703. When the card type external storage device 30 is mounted on the receiving portion 3a of the main body 10, the terminal holding portions 1511, 1512 and 1513 of the receiving portion 3a are inserted into the three spaces 701, 702 and 703, respectively as shown in FIG. 16.

At the upper edge of the opening 603, three upper grooves 604 are formed as shown in FIG. 7. These three upper grooves 604 engage with three upper ridges 1517 at the receiving portion 3a. Three lower grooves 605 are formed under the lower edge of the opening 603. These three lower grooves 605 engage with the three lower ridges 1516 at the receiving portion 3a. The circuit board 602 has a shape cut in conformity with the shape of the upper groove 604.

Figure 8:
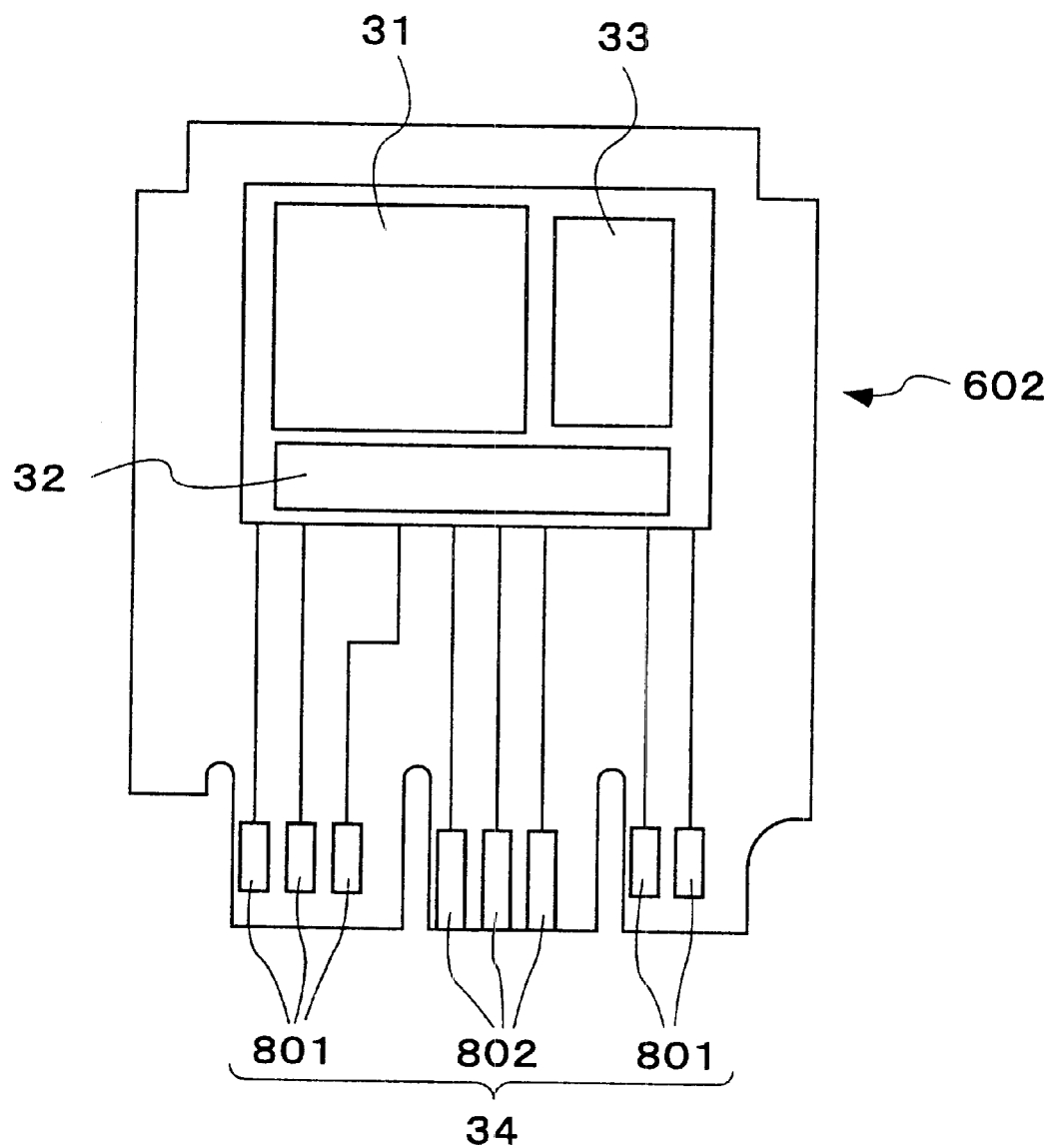
FIG. 8 is a top plan view of the circuit mounted surface of a circuit board 602 within the card type external storage device 30 of the first kind according to the embodiment of the present invention.
Figure 9:
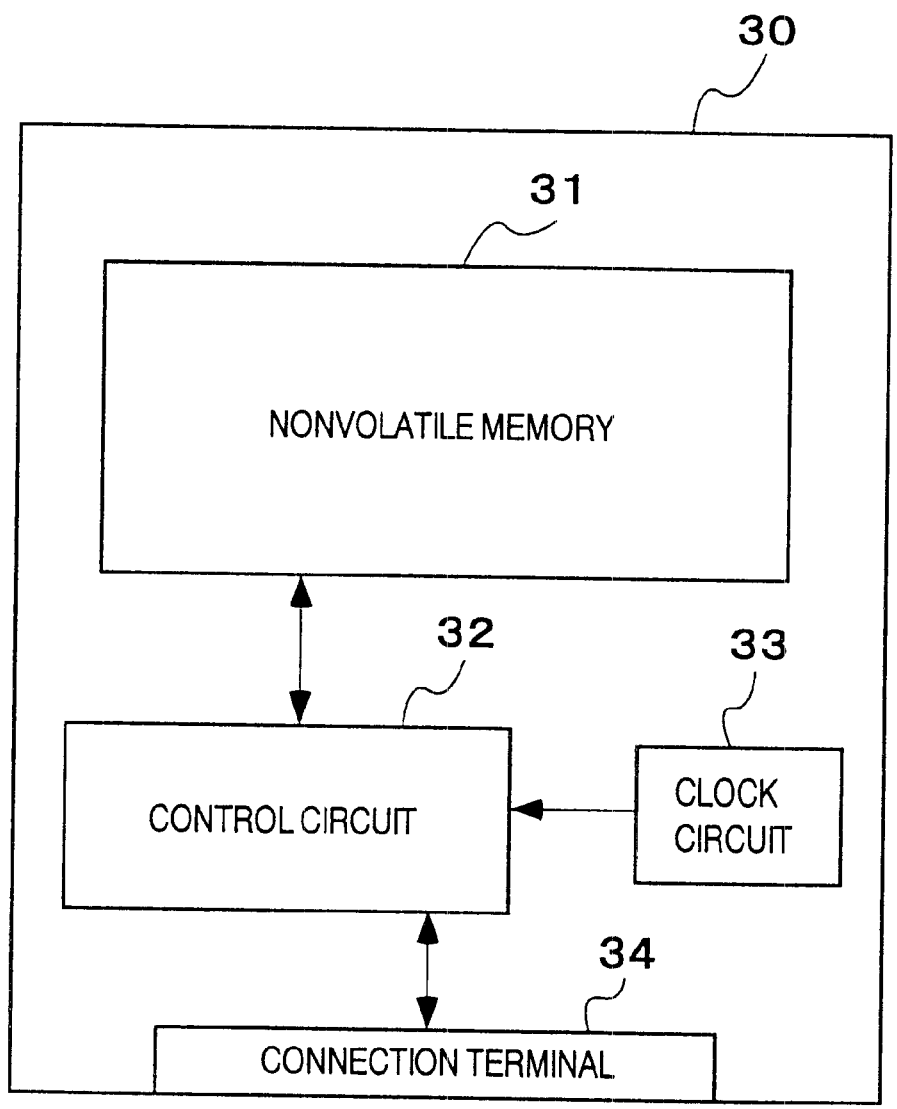
FIG. 9 is a block diagram of the circuit configuration of the card type external storage device 30 of the first kind shown in FIG. 6.

As shown in FIG. 9, the circuit board 602 has a nonvolatile memory 31, a control circuit 32, a clock circuit 33, and a connection terminal 34. Herein, a flash ROM is used for the nonvolatile memory 31. The control circuit 32 communicates with the calculation processing unit 2 of the main body 10 and controls to store/read data in/from the nonvolatile memory 31 according to the contents of the communication. The clock circuit 33 supplies clock signals to the control circuit 32. The connection terminal 34 contacts with the terminal 1501 (FIG. 14) of the receiving portion 3a of the main body 10 at the time of mounting, so as to be connected electrically with the main body 10. The arrangement of each of the circuits on the circuit board 602 is shown in FIG. 8, and the connection terminal 34 is provided at the end on the side of the opening 603. The connection terminal 34 includes signal terminals 801 and power supply terminals 802. The operation power supply for the nonvolatile memory 31, the control circuit 32 and the clock circuit 33 is supplied from the main body 10 via the power supply terminals 802. The power supply terminals 802 are positioned closer to the side of the opening 603 than the signal terminals 801, and at the time of mounting, come into contact with the terminals 1501 on the side of the receiving portion 3a, before the signal terminals 801. Accordingly, it is possible to insert/extract the card type external storage device 30 into/from the main body 10 in a state that power voltage is being supplied to the card type external storage device 30 from the main body 10.

The structure of the receiving portions 203a, 203b of the second type entertainment system 200 and the structure of to the card type external storage device 230 of the second kind will be now described.

Figure 13:
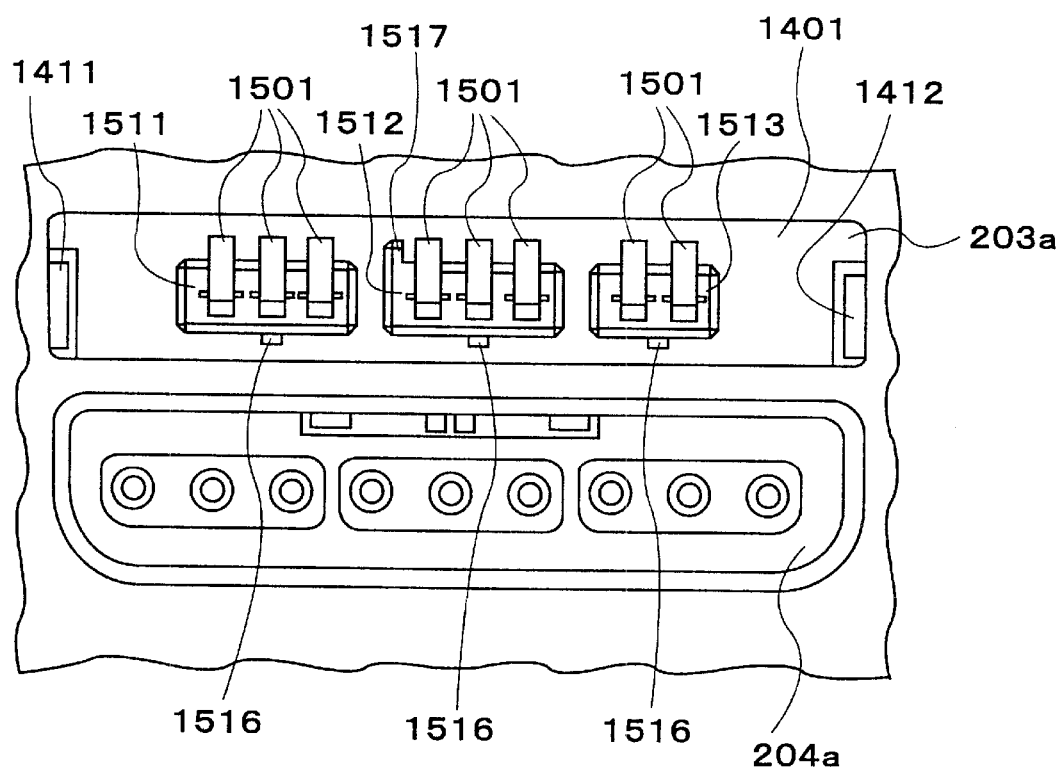
FIG. 13 is a front view of a receiving portion 203a of the second type entertainment system 200 according to an embodiment of the present invention, where a shutter 1402 is removed.

As shown in FIG. 13, the structure of the receiving portion 203a is almost the same as that of the receiving portion 3a of the first type entertainment system 100. A different point is that the number of the upper ridges 1517 is reduced to only one. The only one upper ridge 1517 is provided at the central terminal holding portion 1512 and no ridges are provided at the other terminal holding portions 1511 and 1513. The upper ridge 1517 remains only at the central terminal holding portion 1512 because the width of the opening 1401 of the receiving portion 203a is somewhat smaller than twice the diameter of a typical coin, and therefore if the upper ridge 1517 is present in the center, any inserted conductive foreign body such as a coin will not contact the terminals 1501, so that short-circuiting can be effectively prevented. In addition, the upper ridge 1517 present in the center can effectively serves as a guide. The forefront part of the ridge 1517 is designed to be flush with the forefront part of the terminal 1501. The other structure of the receiving portion 203a is substantially same as that of the receiving portion 3a, and therefore a description is not provided. The structure of the receiving portion 203b is same as that of the receiving portion 203a. Note that the forefront part of the ridge 1517 may be designed to protrude more forward than the forefront part of the terminal 1501 similarly to the case shown in FIG. 15.

Figure 11:
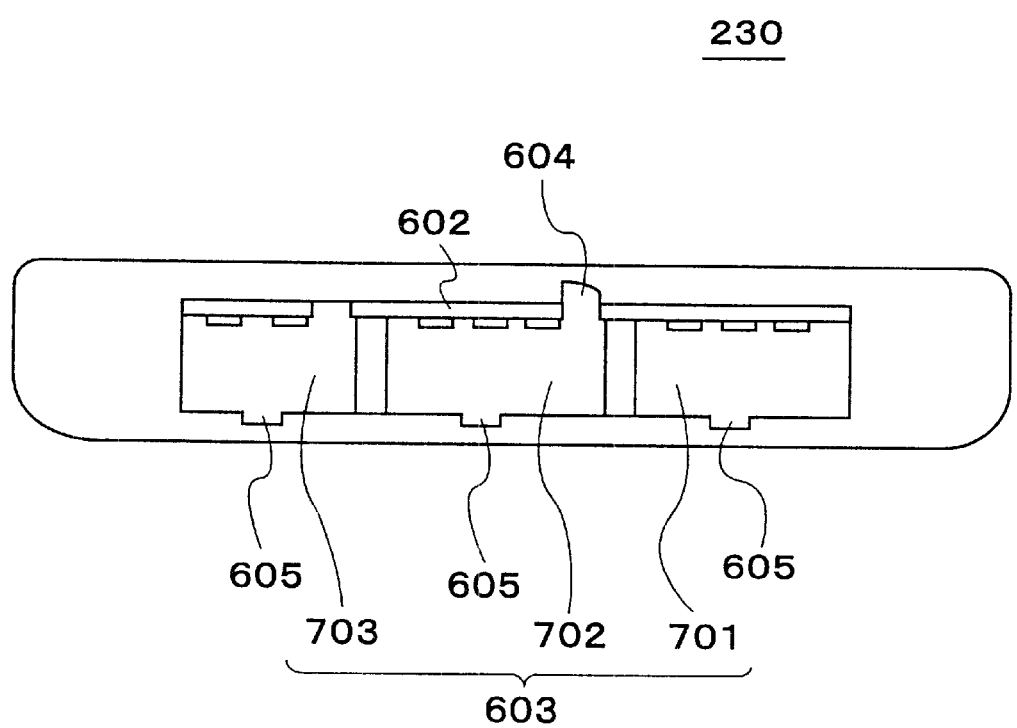
FIG. 11 is a side view of the card type external storage device 230 of the second kind shown in FIG. 10.
Figure 12:
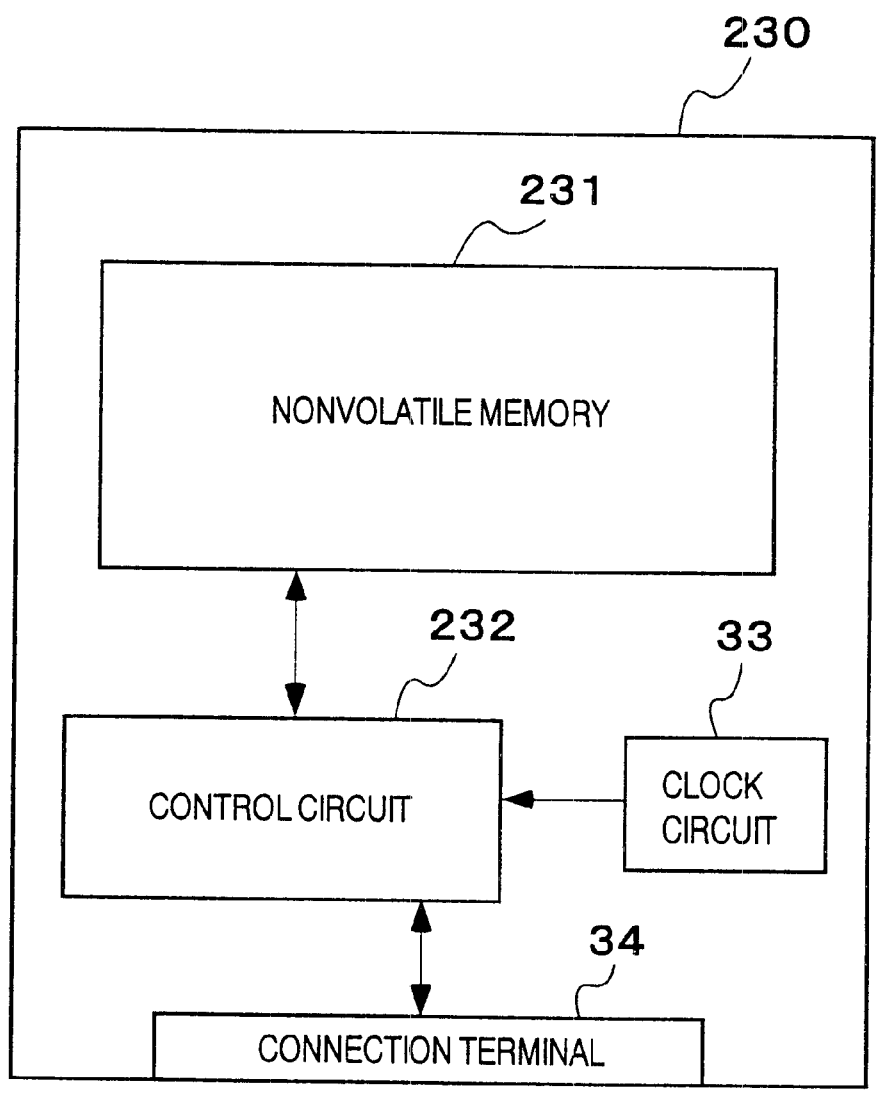
FIG. 12 is a block diagram of the circuit configuration of the card type external storage device 230 of the second kind shown in FIG. 10.

Meanwhile, as shown in FIGS. 10 and 11, when viewed from the outside, the card type external storage device 230 of the second kind looks substantially same as the card type external storage device 30 of the first kind. However, there is only one upper groove 604 to correspond to the only one ridge 1517 of the receiving portion 203a. As shown in FIG.

12, in the card type external storage device 230 of the second kind, the capacity of the nonvolatile memory 231 installed in the circuit board 602 is larger than that of the nonvolatile memory 31 in the card type external storage device 30 of the first kind. The internal circuit configuration of the control circuit 232 is different from that of the control circuit 32 accordingly.

Next, there will be described four cases of inserting the card type external storage devices 30 and 230 of the first and second kinds into the receiving portions 3a, 2a of the entertainment systems 100, 200.

First, when the card type external storage device 30 of the first kind is inserted into the receiving portion 3a of the entertainment system 100 of the first type, the three upper ridges 1517 at the receiving portion 3a in FIG. 14 respectively engage with the three upper grooves 604 at the card type external storage device 30 shown in FIGS. 6 and 7 to guide the insertion. Thus, the card type external storage device 30 of the first kind can be mounted on the receiving portion 3a of the first type entertainment system 100. The calculation processing unit 1 of the first type entertainment system 100 communicates with the control circuit 32 of the card type external storage device 30 of the first kind via the connection terminals 1501 and 34, and allows data representing game information to be stored/read out to/from the nonvolatile memory 31.

Secondly, the case of inserting the card type external storage device 30 of the first kind into the receiving portion 203a of the second type entertainment system 200 will be described. In this case, as shown in FIG. 13, there is only one upper ridge 1517 in the center of the receiving portion 203a, while three grooves 604 are formed at the card type external storage device 30 as shown in FIG. 7. Thus, only the groove 604 in the center is engaged with the ridge 1517, but the other grooves 604 on both sides will not be obstacles to the insertion. The lower ridge 1516 and the groove 605 are engaged to guide the insertion. As a result, the card type external storage device 30 of the first kind can be mounted on the receiving portion 203a of the second type entertainment system 200. The calculation processing unit of the second type entertainment system 200 has a function to adapt to the card external storage device 30 of the first kind as described above. More specifically, the calculation processing unit has a built-in program for communicating with the control circuit 32 of the card type external storage device 30 of the first kind so as to determine whether or not the mounted device is the card type external storage device 30 of the first kind. Thus, when it is determined that the card type external storage device 30 of the first kind is mounted, data representing lo game information can be stored/read out to/from the nonvolatile memory 31 according to the operation of the control circuit 32.

Thirdly, the case of inserting of the card type external storage device 230 of the second kind into the receiving portion 3a of the first type entertainment system 100 will be now described. In this case, there are three upper ridges 1517 at the receiving portion 3a as shown in FIG. 14, while there is only one groove 604 at the card type external storage device 230 of the second kind as shown in FIG. 11. As a result, the upper ridges 1517 on two sides out of the three upper ridges 1517 collide with the edge of the opening 603 of the portion to-be-mounted of the card type external storage device 230 of the second kind and the edge of the opening 603 prevents the insertion. Therefore, the card type external storage device 230 of the second kind cannot be mounted to the receiving portion 3a of the first type entertainment system 100. Thus, the connection of the card type external storage device 230 of the second kind and the receiving portion 3a of the first type entertainment system 100 is avoided. The calculation processing unit of the first type entertainment system 100 does not have a function to adapt to the card type external storage device 230 of the second kind as described above, and therefore if the card type external storage device 230 is mounted on the entertainment system 100 of the first type, game information cannot be stored/read out to/from the card type external storage device 230 using the entertainment system 100. In the structure according to this embodiment, the edge of the opening 603 of the card type external storage device 230 of the second kind prevents the insertion of the upper ridge 1517, hence the mounting itself cannot be achieved, and therefore it is readily determined that they do not correspond to each other before an attempt of communication. Also, it is easy to notify a user that the card type external storage device 230 of the second kind cannot be adapted to the entertainment system 100.

Finally, the case of inserting the card type external storage device 230 of the second kind into the receiving portion 203a of the second type entertainment system 200 will be described. In this case, there is only one upper ridge 1517 formed in the center at the receiving portion 203a, while there is also only one groove 604 formed in the center of the card type external storage device 230. As a result, the ridge 1517 and the groove 604 engage with each other to guide the insertion, so that the card type external storage device 230 of the second kind can be mounted on the receiving portion 203a of the second type 18 entertainment system 200. The calculation processing unit of the second type entertainment system 200 corresponds to the card type external storage device 230 of the second kind, and therefore allows data representing game information to be stored/read out to/from the nonvolatile memory 31 according to the operation of the control circuit 232.

As described above, according to the present embodiment, the receiving portions 3a, 203a or the like of the entertainment systems 100, 200 and the openings of the portions to-be-mounted of the card type external storage devices 30, 230 have the shapes as described above, so that the card type external storage device 30 of the first kind can be mounted on the entertainment system 100 of the first type, while the card type external storage device 230 of the second kind cannot be mounted. The card type external storage devices 30 or 230 of the first and second kinds can be mounted on the entertainment system 200 of the second type. Thus, one-way interchangeability can be achieved for the card type external storage devices 30 and 230.

In addition, according to the structure of the present embodiment, the card type external storage device 230 cannot be mounted on the entertainment system 100 whose communication method is not adaptable, so that there will be no electrical contact between the terminals 1501 and the terminals 34. It is easy to notify the user the inability of mounting, and there is also an advantage that electrical circuits in both of the entertainment system 100 and the external storage device 230 will not be adversely affected at all. In particular, since in this embodiment, the terminals 1501 include power supply terminals as a part, the structure to keep the terminals not to be contacted with each other is particularly effective from a viewpoint of circuit protection.

Furthermore, the inability of mounting as described above makes the user immediately be aware that the device does not fit the system, and therefore the user does not have to understand at all the correspondence between them beforehand. As a result, the user may readily confirm if data can be stored/read out to/from his/her card type external storage device by testing whether or not the device can be mounted to the entertainment system. Therefore, in an entertainment system that allows game information to be stored in a card type external storage device for each player, the card type external storage device can be used without any trouble even if there are plural kinds of entertainment system types.

In addition, according to the embodiment of the present invention, in order to achieve the one-way interchangeability of the external storage devices 30 and 230 described above, the upper ridges 1517 for preventing short circuiting at the receiving portions 3a, 203a of the entertainment systems 100, 200 and for guiding the insertion are used. Thus, any other particular structures to achieve the one-way interchangeability are not necessary to be installed, realizing cost reduction.

It should be noted that in this embodiment, three upper ridges 1517 are provided in the entertainment system 100, while the number of ridges is reduced to only one in the entertainment system 200. However, it is only required that the number of upper ridges 1517 in the entertainment system 200 is smaller than the number of the ridges 1517 in the entertainment system 100, and therefore two ridges 1517 may be provided in the entertainment system 200. The shape of parts other than the upper ridge 1517 may be changed to achieve the one-way interchangeability. For example, the number of the lower ridges 1516 may be reduced. Alternatively, the size of the portion to-be-mounted of the external storage device 230 and the size of the receiving portion 203a of the entertainment system 200 may be made larger than the portion to-be-mounted of the external storage device 30 and the receiving portion 3a of the entertainment system 100, so as to achieve the one-way interchangeability. In such a case, however, the size of receiving portion 203a of the entertainment system 200 and the external storage device 230 maybe cumbersome and should be formed as a different structure, and therefore the use of ridges according to the embodiment is preferable.

In the embodiment described above, the combinations of the entertainment systems and card type external storage devices have been described. In addition, the embodiment of the present invention may be applied to a combination of information processing unit and a small sized external storage device to be directly mounted on the in formation processing unit, by informing receiving portion and the portion to-be-mounted to have the shapes according to the embodiment, whereby one-way interchangeability for the small size external storage devices can be achieved.

As in the foregoing, according to the present invention, an external storage device connected to an entertainment system for storing game information is provided, and the external storage device can be readily connected to an entertainment system without any trouble, even if there are a plurality of types of such entertainment systems and the correspondence between the types of the entertainment systems and kinds of external storage devices cannot be grasped.

The external storage device according to the present invention is useful when there are pluralities of types of entertainment systems and the correspondence between the types of entertainment systems and kinds of external storage devices is too complicated to understand. According to the present invention, the external storage device can be readily connected to the entertainment system without any trouble.

What is claimed is:

1. An external storage device connectable to an entertainment system in a systematized series of entertainment systems for receiving information from the entertainment system and for storing the received information therein, comprising a portion to-be-mounted adapted to engage with a receiving portion of the entertainment system for electrical connection with the entertainment system, said portion to-bemounted having a shape to prevent an engagement with the receiving portion of another entertainment system in the systematized series of entertainment systems in order to prevent a connection with the another entertainment system.

2. An external storage device connectable to an entertainment system in a systematized series of entertainment systems for receiving information from the entertainment system and for storing the received information therein, comprising a portion to-be-mounted adapted to engage with a receiving portion of the entertainment system for electrical connection with the entertainment system, said portion to-be-mounted having a recessed portion in a shape to engage with a raised portion provided at the receiving portion of the entertainment system, wherein
the number of the recessed portions of said portion tone-mounted be-mounted is smaller than the number of the raised portions provided at the receiving portion of another entertainment system out of the entertainment systems in the systematized series of entertainment systems in order to prevent connection with the another entertainment system.

3. An external storage device connectable to an entertainment system in a systematized series of entertainment systems for receiving information from the entertainment system and for storing the received information therein, comprising:

a portion to-be-mounted adapted to engage with a receiving portion of the entertainment system;

a signal terminal adapted to receive the information from the entertainment system; and a power supply terminal adapted to be supplied with a driving voltage from the entertainment system, wherein said signal terminal and said power supply terminal are arranged in said portion to-be-mounted, and said portion to-be-mounted has a shape to prevent contact of said power supply terminal with a power supply terminal provided at the receiving portion of another entertainment system in the systematized series of entertainment systems.

4. An external storage device according to claim 1, further comprising:

a card-shaped case, wherein said portion to-be-mounted is an opening portion provided at an end of said case, and a shape of an edge of said opening portion does not match an outer shape of the receiving portion of the entertainment system.

5. An external storage device according to claim 3, further comprising:

a card-shaped case, wherein said portion to-be-mounted is an opening portion provided at an end of said case, and a shape of an edge of said opening portion does not match an outer shape of the receiving portion of the entertainment system.

6. An entertainment system having a function to transmit information to an external storage device connectable thereto for storage, the external storage device being one of a series of external storage devices, the entertainment system comprising a receiving portion for mounting a portion to-be-mounted of the external storage device, said receiving portion having a shape to engage with the portion to-be-mounted of the external storage device.

7. An entertainment system having a function to transmit information to an external storage device connectable thereto for storage, the external storage device being one of a series of external storage devices, the entertainment system comprising a receiving portion for mounting a portion to-be-mounted of the external storage device, said receiving portion having a shape to engage with a portion common to the portion to-be-mounted in the series of systematized kinds of external storage devices.

8. An entertainment system having a function to transmit information to a first kind of external storage device or a second kind of external storage device connected thereto for storage, comprising a receiving portion for mounting a portion to-be-mounted of either of external storage device, said receiving portion having a raised portion to engage with a recessed portion commonly provided in the portion to-be-mounted of the first kind of external storage device and the portion to-be-mounted of the second kind of external storage device.

9. The entertainment system according to claim 8, wherein said raised portion also serves as a protection portion for protecting a connection terminal at said receiving portion.

* * * * *

UNITED STATES PATENT AND TRADEMARK OFFICE
CERTIFICATE OF CORRECTION

PATENT NO. : 6,456,494 B1
DATED : September 24, 2002
INVENTOR(S) : Tagawa et al.

It is certified that error appears in the above-identified patent and that said Letters Patent is hereby corrected as shown below:

Column 1,
Line 43, delete "a".

Column 2,
Line 66, change "there for" to -- therefor --.

Column 3,
Line 22, change "readout" to -- read out --.
Line 29, after "and" insert -- are --.

Column 4,
Line 1, after "and" insert -- is --.

Column 5,
Line 39, after "and" insert -- to --.

Column 6,
Line 34, delete "to".
Line 64, insert -- the --.

Column 7,
Line 50, delete "lo".

Column 8,
Line 55, insert -- of --.
Line 64, delete "be".

Column 10,
Line 7, delete "to-bemounted" and insert -- to-be-mounted --.
Line 24, delete "tone-mounted be-mounted" and insert -- to-be-mounted --.
Line 29, delete "the".

UNITED STATES PATENT AND TRADEMARK OFFICE
CERTIFICATE OF CORRECTION

PATENT NO.   : 6,456,494 B1
DATED        : September 24, 2002
INVENTOR(S)  : Tagawa et al.

It is certified that error appears in the above-identified patent and that said Letters Patent is hereby corrected as shown below:

<u>Column 12,</u>
Line 4, after "either" insert -- kind --.

Signed and Sealed this

Eleventh Day of March, 2003

JAMES E. ROGAN
*Director of the United States Patent and Trademark Office*